US010768629B2

(12) United States Patent
Song et al.

(10) Patent No.: US 10,768,629 B2
(45) Date of Patent: Sep. 8, 2020

(54) GENERATIVE ADVERSARIAL NETWORK ENRICHED DRIVING SIMULATION

(71) Applicant: Pony AI Inc., Fremont, CA (US)

(72) Inventors: Hao Song, Sunnyvale, CA (US); Jun Peng, Fremont, CA (US); Nengxiu Deng, Fremont, CA (US); Sinan Xiao, Mountain View, CA (US); Tao Qin, Sunnyvale, CA (US); Tiancheng Lou, Milpitas, CA (US); Tianyi Li, Milpitas, CA (US); Xiang Yu, Santa Clara, CA (US); Yubo Zhang, Los Gatos, CA (US)

(73) Assignee: Pony AI Inc., Grand Cayman (KY)

( * ) Notice: Subject to any disclaimer, the term of this patent is extended or adjusted under 35 U.S.C. 154(b) by 122 days.

(21) Appl. No.: 16/043,706

(22) Filed: Jul. 24, 2018

(65) Prior Publication Data

US 2020/0033866 A1 Jan. 30, 2020

(51) Int. Cl.
*G05D 1/00* (2006.01)
*G05D 1/02* (2020.01)
*G06N 3/04* (2006.01)
*G06N 3/08* (2006.01)
*B60W 50/06* (2006.01)
*G06N 20/00* (2019.01)
*B60W 50/00* (2006.01)

(52) U.S. Cl.
CPC ........... *G05D 1/0221* (2013.01); *B60W 50/06* (2013.01); *G05D 1/0088* (2013.01); *G06N 3/0454* (2013.01); *G06N 3/088* (2013.01); *G06N 20/00* (2019.01); *B60W 2050/0028* (2013.01); *B60W 2050/0088* (2013.01); *G05D 2201/0213* (2013.01)

(58) Field of Classification Search
CPC ...... G05D 1/0221; G05D 1/0088; G05D 1/10; G01C 21/3602; G01C 21/3617; G01C 21/3638; G01C 21/3655; G06N 20/00
USPC .......................................................... 701/23
See application file for complete search history.

(56) References Cited

U.S. PATENT DOCUMENTS

| 10,346,450 | B2 * | 7/2019 | Noguero | ............. | G06F 16/9024 |
| 10,423,647 | B2 * | 9/2019 | Llagostera | ........... | G06N 3/0445 |
| 2018/0165554 | A1 * | 6/2018 | Zhang | .................. | G06K 9/6269 |
| 2018/0284745 | A1 * | 10/2018 | Cella | ................ | G05B 19/41875 |
| 2018/0349526 | A1 | 12/2018 | Atsmon et al. | | |

(Continued)

FOREIGN PATENT DOCUMENTS

| CA | 3045439 A1 * | 11/2017 | ......... G05B 23/0283 |
| WO | WO-2017196821 A1 * | 11/2017 | ......... G05B 19/0425 |

*Primary Examiner* — Cuong H Nguyen
(74) *Attorney, Agent, or Firm* — Sheppard Mullin Richter & Hampton LLP

(57) ABSTRACT

A computer-implemented method and a system for training a computer-based autonomous driving model used for an autonomous driving operation by an autonomous vehicle are described. The method includes: creating time-dependent three-dimensional (3D) traffic environment data using at least one of real traffic element data and simulated traffic element data; creating simulated time-dependent 3D traffic environmental data by applying a time-dependent 3D generic adversarial network (GAN) model to the created time-dependent 3D traffic environment data; and training a computer-based autonomous driving model using the simulated time-dependent 3D traffic environmental data.

18 Claims, 5 Drawing Sheets

(56) References Cited

U.S. PATENT DOCUMENTS

| | | | |
|---|---|---|---|
| 2019/0132343 A1* | 5/2019 | Chen | G06N 3/084 |
| 2019/0147582 A1 | 5/2019 | Lee et al. | |
| 2019/0228110 A1* | 7/2019 | Yan | G06N 3/0454 |
| 2019/0303759 A1 | 10/2019 | Farabet et al. | |
| 2019/0311298 A1* | 10/2019 | Kopp | G06K 9/00791 |
| 2019/0325264 A1* | 10/2019 | Keserich | G01C 21/3602 |
| 2019/0339684 A1* | 11/2019 | Cella | H04B 17/309 |
| 2019/0356588 A1* | 11/2019 | Shahraray | G06N 3/08 |
| 2019/0392596 A1* | 12/2019 | Yang | G06K 9/00657 |
| 2020/0033866 A1* | 1/2020 | Song | G05D 1/0221 |
| 2020/0129780 A1* | 4/2020 | Lachaine | G06N 3/08 |
| 2020/0129784 A1* | 4/2020 | Beriault | A61N 5/1067 |
| 2020/0133255 A1* | 4/2020 | Cella | G05B 19/41875 |
| 2020/0150643 A1* | 5/2020 | Cella | G05B 23/0297 |

* cited by examiner

GENERATIVE ADVERSARIAL NETWORK ENRICHED DRIVING SIMULATION

BACKGROUND

Today many researcher are conducting research on autonomous driving, and autonomous driving has been rapidly developed accordingly. One of the core technologies of autonomous driving is an autonomous driving model, such as an autonomous driving algorithm, configured to make decisions about behavior of a vehicle depending on surrounding traffic environment. To improve the autonomous driving model for safer and more efficient driving, typically machine learning may be employed. According to the machine learning, test autonomous driving is carried out in a real or virtual traffic environment, using the autonomous driving model to be tested, and the autonomous driving model is improved according to a machine learning algorithm, based on the test result. The test autonomous driving in the virtual traffic environment may be advantageous in cost, public safety, and time efficiency, compared to the test autonomous driving in the real traffic environment. However, the virtual traffic environment according to the current technology may not be identical to the real traffic environment, and improvement of the virtual traffic environment to be closer to the real traffic environment may be required to reflect real environmental conditions.

These and other issues are addressed, resolved, and/or reduced using techniques described herein. The foregoing examples of the related art and limitations related therewith are intended to be illustrative and not exclusive. Other limitations of the related art will become apparent to those of skill in the relevant art upon a reading of the specification and a study of the drawings.

SUMMARY

Described herein are a method and a system for training a computer-based autonomous driving model, which can be used for an autonomous driving operation by an autonomous vehicle. The system includes one or more processors; and a memory storing instructions that, when executed by the one or more processors.

In one embodiment, the disclosure describes a computer-implemented method including: creating time-dependent three-dimensional (3D) traffic environment data using at least one of real traffic element data and simulated traffic element data; creating simulated time-dependent 3D traffic environmental data by applying a time-dependent 3D generic adversarial network (GAN) model to the created time-dependent 3D traffic environment data; and training a computer-based autonomous driving model using the simulated time-dependent 3D traffic environmental data.

In some embodiments, the method may further comprise creating the time-dependent 3D generative adversarial network (GAN) model through an adversarial machine learning process of a time-dependent 3D (which is also referred to simply as "four-dimensional (4D)") GAN discriminator sub-model and a time-dependent 3D GAN generator sub-model of the time-dependent 3D GAN model.

In some embodiments, the adversarial machine learning process of the time-dependent 3D GAN discriminator sub-model may comprise: receiving time-dependent 3D GAN discriminator training data from the time-dependent 3D GAN generator sub-model; and performing, using the time-dependent 3D GAN discriminator sub-model, discrimination analysis of the received time-dependent 3D GAN discriminator training data to generate a discrimination result indicating whether the time-dependent 3D GAN discriminator sub-model determined that the time-dependent 3D GAN discriminator training data represents real-world time-dependent 3D traffic environmental data or simulated time-dependent 3D traffic environmental data. The adversarial machine learning process of the time-dependent 3D GAN discriminator sub-model may further comprise: performing matching of the generated discrimination result with supervisory data indicating whether the time-dependent 3D GAN discriminator training data represents real-world time-dependent 3D traffic environmental data or simulated time-dependent 3D traffic environmental data, to generate a training result indicating a trained level of the time-dependent 3D GAN discriminator sub-model; and modifying parameter values of the time-dependent 3D GAN discrimination sub-model based on the training result.

In some embodiments, the adversarial machine learning process of the time-dependent 3D GAN generator sub-model may comprise: generating, using the time-dependent 3D GAN generator sub-model, simulated time-dependent 3D traffic environmental data; and providing the generated simulated time-dependent 3D traffic environmental data for creating time-dependent 3D GAN discriminator training data to be used by the time-dependent 3D GAN discriminator sub-model. The adversarial machine learning process of the time-dependent 3D GAN generator sub-model may further comprise receiving the training from the time-dependent 3D GAN discriminator sub-model; and modifying parameter values of the time-dependent 3D GAN generator sub-model based on the training result.

In some embodiments, the method may further comprise performing a real-world autonomous driving operation using the trained computer-based autonomous driving model.

In some embodiments, the simulated time-dependent 3D traffic environmental data may include object movement data indicating irregular movement of objects around roads. In some embodiments, the real traffic element data is used to create the time-dependent 3D traffic environment data, and the real traffic element data may include at least one of geographical mapping data, traffic sign data, and traffic signal data of a real-world geographical region. In some embodiments, the simulated traffic element data is used to create the time-dependent 3D traffic environment data, and the simulated traffic element data may include at least one of simulated weather data, simulated traffic signal change data, simulated pedestrian data, and simulated obstacles data.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
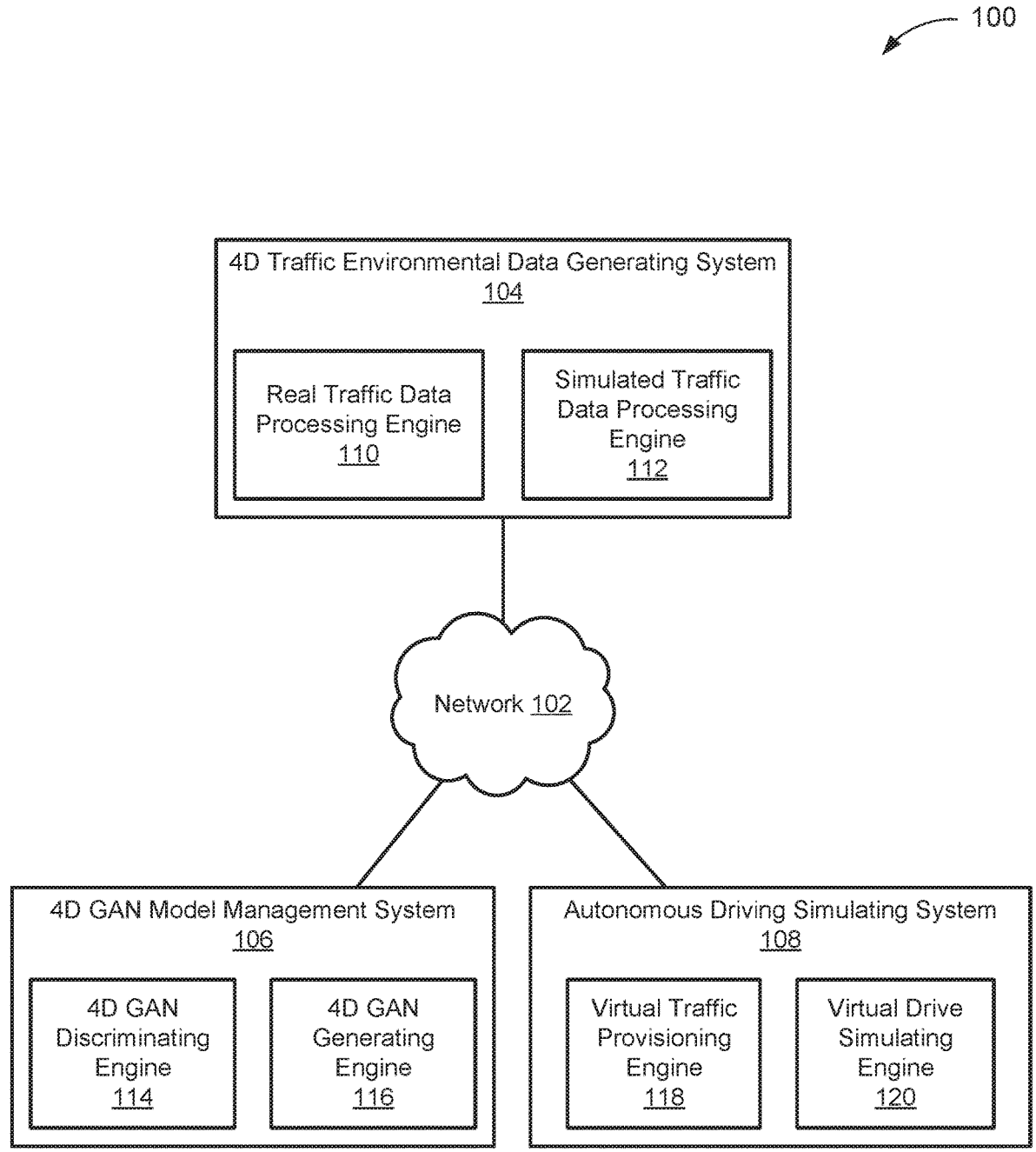
FIG. 1 is a schematic diagram depicting an example of a system for training a computer-based autonomous driving model according to some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments described herein are directed to a computer-implemented method and a system for training a computer-based autonomous driving model to be employed in an autonomous-driving vehicle (or simply autonomous vehicle). In a specific implementation, the computer-implemented method and the system are intended to provide a training scheme of a computer-based autonomous driving model without carrying out a high-cost and less-safe real-world test driving operations with a vehicle in a real-world traffic environment. Further, the technology in certain implementations of the present disclosure can create simulated time-dependent three-dimensional (3D) (hereinafter referred to simply as "four-dimensional (4D)") traffic environments using a computer-based model created as a result of performing an adversarial machine learning process, which enables to create photorealistic simulated 4D traffic environments sufficiently close to real 4D traffic environments. Real 4D traffic environments involve irregular events, such as irregular movement of objects (e.g., pedestrian's irregular movement in response to a large noise, wind, road bumps, etc.). By reflecting such irregular events in simulated 4D traffic environments, the photorealistic simulated 4D traffic environments can be created and driving simulation in more realistic traffic environment can be carried out. It is noted here that "4D" is intended to represent time-dependent three-dimensional (3D) space, where objects in the 3D space are capable of moving and changing their shapes according to time passage. For example, leaves of a tree and a skirt of a pedestrian may flap in a 4D environment as time passage, as opposed to a 3D environment where all objects are static and there is no movement or change of shapes of objects.

One embodiment provides a computer-implemented method including: creating four-dimensional (4D) traffic environment data using at least one of real traffic element data and simulated traffic element data; creating simulated 4D traffic environmental data by applying a 4D generic adversarial network (GAN) model to the created four-dimensional (4D) traffic environment data; and training a computer-based autonomous driving model using the simulated 4D traffic environmental data. Another embodiment provides system for an autonomous-driving vehicle, comprising: one or more processors; and memory storing instructions that, when executed by the one or more processors, cause the one or more processors to perform the computer-implemented method.

FIG. 1 is a schematic diagram 100 depicting an example of a system for training a computer-based autonomous driving model according to some embodiments. In the example depicted in FIG. 1, the system for training a computer-based autonomous driving model includes a network 102, and a 4D traffic environmental data generating system 104, a 4D GAN model management system 106, and an autonomous driving simulating system 108 connected through the network 102.

In the example depicted in FIG. 1, the system for training a computer-based autonomous driving model represents a system primarily dedicated to train a computer-based autonomous driving model to be mounted on an autonomous-driving vehicle, which is capable of sensing its environment and navigating with a limited human input or without human input. The "vehicle" discussed in this paper typically includes a vehicle that drives on the ground, such as wheeled vehicles, and may also include a vehicle that flies in the sky (e.g., drones, helicopter, airplanes, and so on). The "vehicle" discussed in this paper may or may not accommodate one or more passengers therein.

In one embodiment, the autonomous-driving vehicle includes a vehicle that controls braking and/or acceleration without real time human input. In another embodiment, the autonomous-driving vehicle includes a vehicle that controls steering without real time human input based on inputs from one or more lens mount units. In another embodiment, the autonomous-driving vehicle includes a vehicle that autonomously controls braking, acceleration, and steering without real time human input specifically for parking the vehicle at a specific parking space, such as a parking lot, a curb side of a road (e.g., parallel parking), and a home garage, and so on. Further, "real time human input" is intended to represent a human input that is needed to concurrently control movement of a non-autonomous-driving vehicle, such as gear shifting, steering control, braking pedal control, accel pedal control, crutch pedal control, and so on.

In one embodiment, the autonomous-driving vehicle is capable of sensing its environment based on inputs from one or more imaging devices (e.g., camera) mounted on the autonomous-driving vehicle. In an embodiment, the autonomous-driving vehicle is configured to analyze image data obtained from the one or more imaging devices and identify objects (e.g., traffic signals, road signs, other vehicles, pedestrians, and obstacles) included in images of the analyzed image data. In one embodiment, the autonomous-driving vehicle is also capable of performing an autonomous-driving operation based on the identified objects. In an embodiment, the autonomous-driving vehicle is also capable of drive the vehicle so as to follow a traffic stream without hitting the identified objects. For example, the autonomous-driving vehicle follow traffic signals identified based on image data, follow traffic signs identified based on image data, and drive with a sufficient distance from preceding vehicles.

In the example of FIG. 1, the autonomous-driving vehicle is also capable of communicating with systems or devices connected to the autonomous-driving vehicle through a network. In an embodiment, the autonomous-driving vehicle communicates with a server via the network. For example, the autonomous-driving vehicle pulls up from the server map information (e.g., local map, parking structure map, floor plan of buildings, and etc.) of a region around the autonomous-driving vehicle. In another example, the autonomous-driving vehicle periodically notifies information of the autonomous-driving vehicle such as locations and directions thereof to the server.

In some embodiments, the network 102 represents a variety of potentially applicable technologies. For example, the network 102 can be used to form a network or part of a larger network. Where two components are co-located on a device, the network can include a bus or other data conduit or plane. Depending upon implementation-specific or other considerations, the network 102 can include wired communication interfaces and wireless communication interfaces for communicating over wired or wireless communication channels. Where a first component is located on a first device and a second component is located on a second (different) device, the network can include a wireless or wired back-end network or LAN. The network 102 can also encompass a relevant portion of a WAN or other network, if applicable. Enterprise networks can include geographically distributed LANs coupled across WAN segments. For example, a distributed enterprise network can include multiple LANs (each LAN is sometimes referred to as a Basic Service Set (BSS) in IEEE 802.11 parlance, though no explicit requirement is suggested here) separated by WAN segments. An enterprise network can also use VLAN tunneling (the connected LANs are sometimes referred to as an Extended Service Set (ESS) in IEEE 802.11 parlance, though no explicit requirement is suggested here). Depending upon implementation or other considerations, the network 102 can include a private cloud under the control of an enterprise or third party, or a public cloud.

In an embodiment, the autonomous-driving vehicle may communicate with one or more other autonomous-driving vehicle systems via the network 102. For example, the autonomous-driving vehicle sends information of a vehicle route of the corresponding autonomous-driving vehicle to the one or more other autonomous-driving vehicle systems, such that traffic incidents such as collisions can be prevented. In another example, the autonomous-driving vehicle commands one or more other autonomous-driving police systems to proceed to a particular location so as to avoid traffic incidents.

In the example depicted in FIG. 1, the 4D traffic environmental data generating system 104 represents a system for generating 4D traffic environmental data. The 4D traffic environment data may represent basic time-dependent traffic environment in a virtual or real geographical region, which is to be applied to a 4D GAN model to generate a virtual photorealistic 4D traffic environment. In the example depicted in FIG. 1, the 4D traffic environmental data generating system 104 includes a real traffic data processing engine 110 and a simulated traffic data processing engine 112. In the example depicted in FIG. 1, the real traffic data processing engine 110 represents a hardware module configured to generate real traffic element data. In some embodiments, the real traffic element data include one or more of mapping data in real-world geographical locations, traffic indicator data indicating traffic signs and traffic signals in real-world environments, traffic regulatory data indicating traffic regulations in specific real-world regions, and so on. In some embodiments, the real traffic data processing engine 110 generates the real traffic element data based on data obtained from public resources or commercial resources.

In the example depicted in FIG. 1, the simulated traffic data processing engine 112 represents a hardware module configured to generate simulated traffic element data. In some embodiments, the simulated traffic element data include one or more of simulated weather data in real/virtual geographical locations, simulated time-frame data indicating environmental conditions (e.g., brightness, congestion, noise, etc.) in a specific time in a day, signal change data indicating timing of changing traffic signals in real/virtual geographical locations, simulated outside object data indicating outside objects (e.g., pedestrian and other road-side objects) and movement thereof, and so on. In some embodiments, the simulated traffic data processing engine 112 is further configured to generate 4D traffic environment data using real and/or simulated traffic element data.

In the example depicted in FIG. 1, the 4D GAN model management system 106 represents a system for managing a 4D GAN model. In some embodiments, the 4D GAN model represents computer instructions configured to cause a photorealistic effect to be applied to 4D traffic environment represented by 4D traffic environment data to generate photorealistic 4D traffic environment. To generate the photorealistic 4D traffic environment, the 4D GAN model includes a 4D GAN discrimination sub-model and a 4D GAN generator sub-model configured to perform an adversarial machine learning process. An example of an adversarial machine learning process according to some embodiments will be described below with reference to FIG. 3. In the example depicted in FIG. 1, the 4D GAN model management system 106 includes a 4D GAN discriminating engine 114 and a 4D GAN generating engine 116. In the example depicted in FIG. 1, the 4D GAN discriminating engine 114 represents a hardware module configured to train the 4D GAN discrimination sub-model through the adversarial machine learning process. In the example depicted in FIG. 1, the 4D GAN generating engine 116 represents a hardware module configured to train the 4D GAN generator sub-model.

In the example depicted in FIG. 1, the autonomous driving simulating system 108 represents a system for training an autonomous driving model through a virtual autonomous driving operation in a virtual photorealistic 4D traffic environment. In the example depicted in FIG. 1, the autonomous driving simulating system 108 includes a virtual traffic presentation engine 118 and a virtual drive simulating engine 120 to achieve the functionality thereof. In the example depicted in FIG. 1, the virtual traffic presentation engine 118 represents a hardware module configured to generate virtual photorealistic 4D traffic environment using simulated 4D traffic environmental data. In some embodiments, the generate virtual photorealistic 4D traffic environment is a time-dependent three-dimensional virtual traffic environment in which a virtual vehicle is capable of performing a virtual driving operation. An example of specific processes to generate the virtual photorealistic 4D traffic environment will be described below with reference to FIG. 4.

In the example depicted in FIG. 1, the virtual drive simulating engine 120 represents a hardware module configured to carry out a virtual autonomous driving operation in a virtual photorealistic 4D traffic environment generated by the virtual traffic presentation engine 118. In some embodiments, the virtual autonomous driving operation includes a virtual autonomous driving along a certain route from a certain departing point in the virtual photorealistic 4D traffic environment to a certain destination point in the virtual photorealistic 4D traffic environment. An example of specific processes to train an autonomous driving model through the virtual autonomous driving operation will be described below with reference to FIG. 4.

Figure 2:
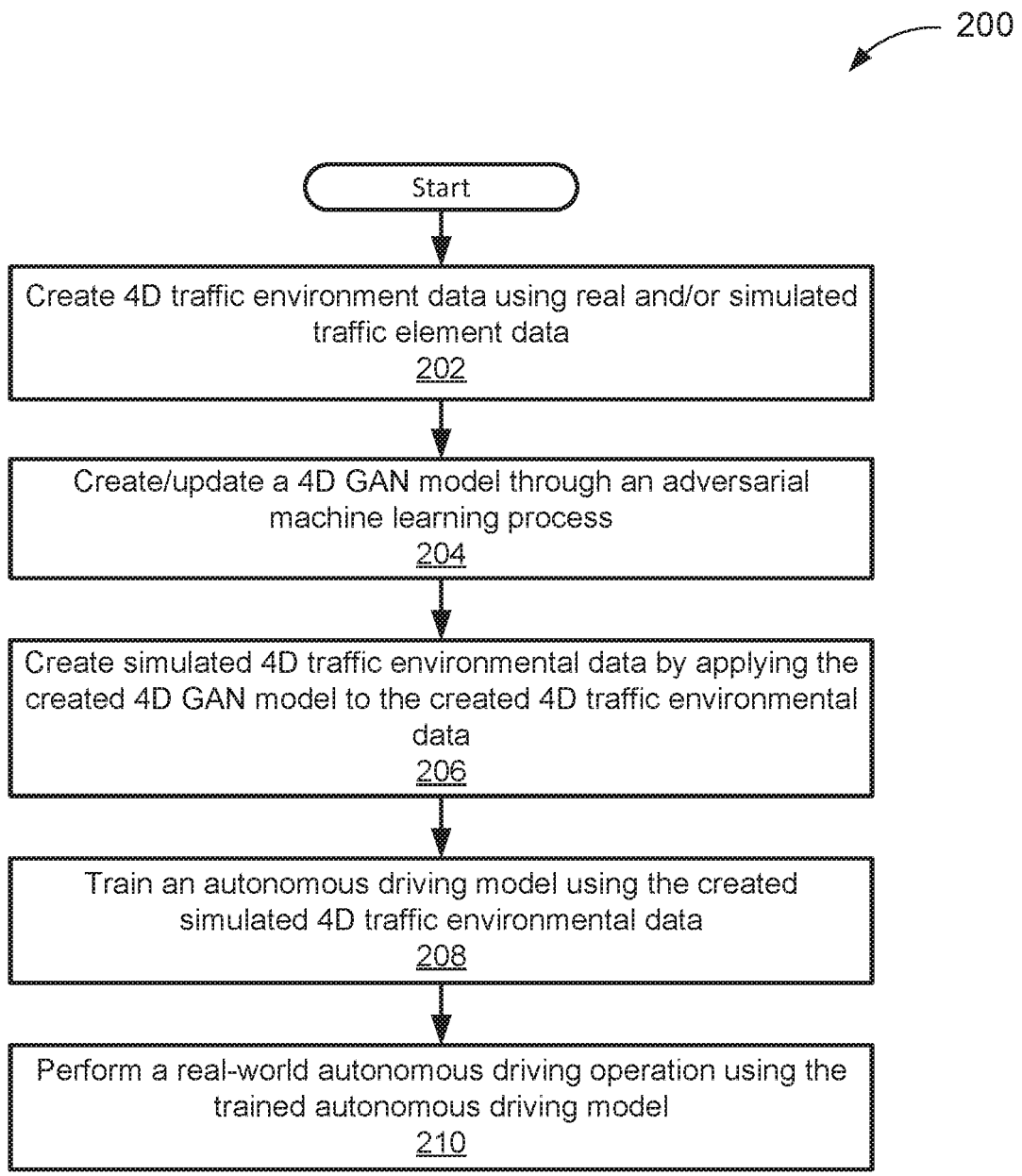
FIG. 2 depicts a flowchart of an example of a method for training a computer-based autonomous driving model according to some embodiments.

FIG. 2 depicts a flowchart 200 of an example of a method for training a computer-based autonomous driving model according to some embodiments. This flowchart and other flowcharts described in this paper illustrate modules (and potentially decision points) organized in a fashion that is conducive to understanding. It should be recognized, however, that the modules can be reorganized for parallel execution, reordered, modified (changed, removed, or augmented), where circumstances permit. In the example of FIG. 2, the flowchart 200 starts at module 202 with creating 4D traffic environment data using real and/or simulated traffic element data. An applicable engine for creating 4D traffic environment data such as a real traffic data processing engine (e.g., the real traffic data processing engine 110 in FIG. 1) and/or a simulated traffic data processing engine (e.g., the simulated traffic data processing engine 112 in FIG. 1) creates the 4D traffic environment data. In some embodiments, the real traffic element data include one or more of mapping data in real-world geographical locations, traffic indicator data indicating traffic signs and traffic signals in real-world environments, traffic regulatory data indicating traffic regulations in specific real-world regions, and so on. In some embodiments, the simulated traffic element data include one or more of simulated weather data in real/virtual geographical locations, simulated time-frame data indicating environmental conditions (e.g., brightness, congestion, etc.) in a specific time in a day, signal change data indicating timing of changing traffic signals in real/virtual geographical locations, simulated outside object data indicating outside objects (e.g., pedestrian and other road-side objects) and movement thereof, and so on.

In the example of FIG. 2, the flowchart 200 continues to module 204, with creating/updating a 4D GAN model through an adversarial machine learning process. An applicable engine for creating/updating a 4D GAN model, such as a 4D GAN generating engine (e.g., the 4D GAN generating engine 116 in FIG. 1) described in this paper, can create/update the 4D GAN model through an adversarial machine learning process. A specific example of an adversarial machine learning process according to some embodiments will be described below with reference to FIG. 3. As a result of the adversarial machine learning process, the 4D GAN model, in particular, a 4D GAN generator sub-model, can be configured to create simulated 4D traffic environmental data sufficiently close to real 4D traffic environmental data.

In the example of FIG. 2, the flowchart 200 continues to module 206, with creating simulated 4D traffic environmental data by applying the created 4D GAN model to the created 4D traffic environmental data. An applicable engine for creating simulated 4D traffic environmental data, such as a 4D GAN generating engine (e.g., the 4D GAN generating engine 116 in FIG. 1) described in this paper, can create the simulated 4D traffic environmental data. In some embodiments, the simulated 4D traffic environmental data include expression of time-dependent locations and time-dependent characteristics of objects, such as roads, vehicles, pedestrians, road-side objects, and so on, with 4D functions.

In the example of FIG. 2, the flowchart 200 continues to module 208, with training an autonomous driving model using the created simulated 4D traffic environmental data. An applicable engine for training an autonomous driving model, such as a virtual drive simulating engine (e.g., the virtual drive simulating engine 120 in FIG. 1) described in this paper, can train the autonomous driving model. A specific example of a process for training the autonomous driving model according to some embodiments will be described below with reference to FIG. 4. As a result of the training process, the autonomous driving model can be configured to perform an autonomous driving operation in a safer, more time-efficient, and/or more cost-efficient manner.

In the example of FIG. 2, the flowchart 200 continues to module 210, with performing a real-world autonomous driving operation using the trained autonomous driving model. An applicable engine or module for performing a real-world autonomous driving operation mounted in a real-world autonomous driving vehicle can perform the real-world autonomous driving operation. In some embodiments, an engine that is the same or substantially similar to the virtual drive simulating engine (e.g., the virtual drive simulating engine 120 in FIG. 1) described in this paper, can be employed for the engine or module for performing a real-world autonomous driving operation. As a result of the real-world autonomous driving operation using the trained autonomous driving model, the real-world autonomous driving vehicle can perform an real-world autonomous driving operation in a safer, more time-efficient, and/or more cost-efficient manner.

Figure 3:
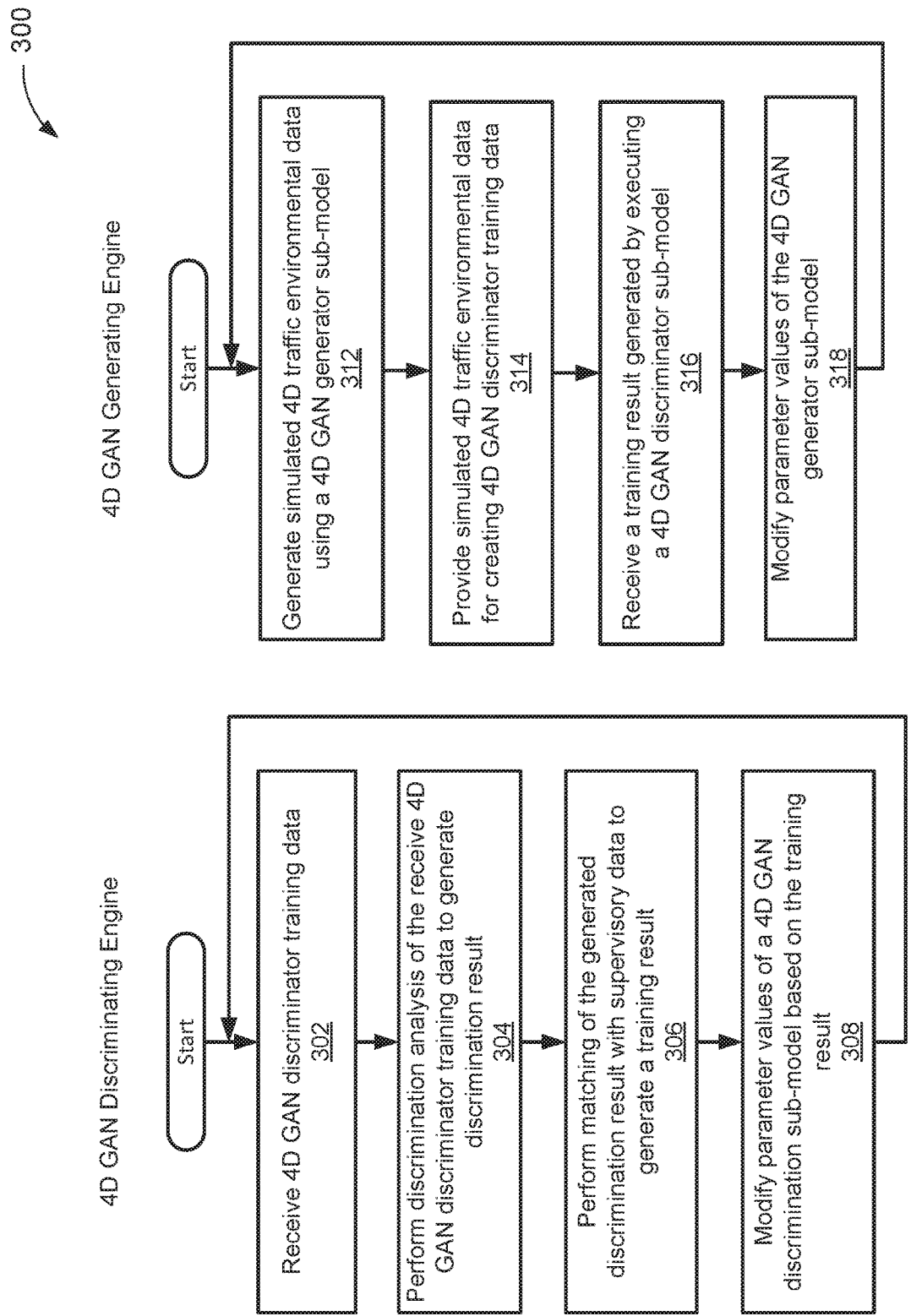
FIG. 3 depicts a flowchart of an example of a method for performing an adversarial machine learning process for a four-dimensional (4D) generative adversarial network (GAN) model according to some embodiments.

FIG. 3 depicts a flowchart 300 of an example of a method for performing an adversarial machine learning process for a four-dimensional (4D) generative adversarial network (GAN) model according to some embodiments. In the example of FIG. 3, the modules 302-308 in the flowchart 300 are carried out by an applicable engine such as a 4D GAN discriminating engine (e.g., the 4D GAN discriminating engine 114 in FIG. 1) described in this paper, to train a 4D GAN discriminator sub-model of the 4D GAN model. The modules 302-308 in the flowchart 300 are carried out by an applicable engine such as a 4D GAN generating engine (e.g., 4D GAN generating engine 116 in FIG. 1) described in this paper, to train a 4D GAN generator sub-model of the 4D GAN model.

In the example of FIG. 3, the modules of the flowchart 300 carried out by the 4D GAN discriminating engine starts at module 302, with receiving 4D GAN discriminator training data. In some embodiments, the 4D GAN discriminator training data include pieces of simulated 4D traffic environmental data and pieces of real 4D traffic environmental data. The simulated 4D traffic environmental data includes 4D traffic environmental data generated through computer-based simulation using the 4D GAN generator sub-model by an applicable engine, such as a 4D GAN generating engine (e.g., 4D GAN generating engine 116 in FIG. 1) described in this paper. The real 4D traffic environmental data includes 4D traffic environmental data corresponding to recorded data of a traffic environment in a real world.

In the example of FIG. 3, the flowchart 300 continues to module 304, with performing a discrimination analysis of the received 4D GAN discriminator training data to generate a discrimination result. In some embodiments, the discrimination analysis of the receive 4D GAN discriminator training data include computer-based analysis of 4D traffic environmental data included in the received 4D GAN discriminator training data, and prediction of whether the analyzed of 4D traffic environmental data is simulated 4D traffic environmental data or real 4D traffic environmental data. To distinguish the simulated 4D traffic environmental data from the real 4D traffic environmental data, the 4D GAN discriminating engine executes a 4D GAN discriminator sub-model. In some embodiments, the discrimination result includes whether the 4D GAN discriminating engine predicts the received 4D GAN discriminator training data as simulated 4D traffic environmental data or real 4D traffic environmental data.

In some embodiments, the discrimination result may further include a basis or ground based on which the 4D GAN discriminating engine made the prediction, and the basis or ground may include one or more specific objects in a 4D traffic environment represented by the 4D GAN discriminator training data, and specific characteristics of the one or more specific objects that enabled the prediction. For example, a constant-pace non-meandering walking pattern of a pedestrian in a 4D traffic environment represented by the 4D GAN discriminator training data may be a basis to predict that the 4D GAN discriminator training data is simulated 4D traffic environmental data. In another example, non-flapping clothes of pedestrians while leaves of roadside trees are flapping may be a basis to predict that the 4D GAN discriminator training data is simulated 4D traffic environmental data.

In the example of FIG. 3, the flowchart 300 continues to module 306, with performing matching of the generated discrimination result with supervisory data to generate a training result. In some embodiments, the supervisory data may include a correct answer indicating whether the 4D GAN discriminator training data is in fact simulated 4D traffic environmental data or real 4D traffic environmental data. In some embodiments, the training result includes accuracy of the generated discrimination result and the basis or ground based on which the 4D GAN discriminating engine made the prediction to generate the discrimination result. In some embodiments, the training result may be a cumulative training result of a plurality of operations of the discrimination analysis with respect to a plurality of pieces of 4D traffic environmental data. In that case, the training result may include an accuracy rate calculated by accuracy of each matching of each discrimination result with corresponding supervisory data.

In the example of FIG. 3, the flowchart 300 continues to module 308, with modifying parameter values of the 4D GAN discrimination sub-model based on the training result. In some embodiments, the parameters of the 4D GAN discrimination sub-model may include various applicable parameters, including one or more parameters indicating irregularity of movement of objects (e.g., vehicles, pedestrians, roadside objects, etc.) in a traffic environment, one or more parameters indicating conformity of light reflection in the traffic environment, one or more parameters indicating abnormality of ambient sound (e.g., engine sound, tire noise, honking sound, human voice, bicycle noise, audio sounds from vehicle, etc.), and so on. In some embodiments, the 4D GAN discriminating engine increases one or more parameter values of the parameters of the 4D GAN discrimination sub-model associated with the basis of the prediction and/or decreases one or more parameter values of the parameters of the 4D GAN discrimination sub-model not associated with the basis of the prediction when the generated discrimination result matches the corresponding supervisory data. To the contrary, the 4D GAN discriminating engine may increase one or more parameter values of the parameters of the 4D GAN discrimination sub-model not associated with the basis of the prediction and/or decreases one or more parameter values of the parameters of the 4D GAN discrimination sub-model associated with the basis of the prediction when the generated discrimination result does not match the corresponding supervisory data.

In the example of FIG. 3, the modules of the flowchart 300 carried out by the 4D GAN generating engine starts at module 312, with generating simulated 4D traffic environmental data using a 4D GAN generator sub-model. In some embodiments, the simulated 4D traffic environmental data includes 4D traffic environmental data in a virtual environment. For example, the 4D traffic environmental data in a virtual environment may include arrangement of roads (e.g., geographical mapping), vehicles on the roads, pedestrians and other road-side objects, atmospheric setting (e.g., weather, time, etc.) in the virtual environment. Depending on the specific implementation, part of the 4D traffic environmental data, such as the arrangement of roads and atmospheric setting may be imported from real 4D traffic environmental data.

In the example of FIG. 3, the flowchart continues to module 314, with providing simulated 4D traffic environmental data for creating 4D GAN discriminator training data. In a specific implementation, the simulated 4D traffic environmental data generated using the 4D GAN generator sub-model are provided to the 4D GAN discrimination engine as a piece of 4D GAN discriminator training data, such that the 4D GAN discrimination engine can perform the discrimination analysis. The simulated 4D traffic environmental data includes some noise to make a simulated 4D traffic environment more similar to a real 4D traffic environment. For example, the noise to be included in the simulated 4D traffic environmental data may be irregular movement of objects, such as pedestrians, clothes (e.g., skirt) worn by pedestrians, road-side trees and leaves thereof, and so on. In another example, the noise to be included in the simulated 4D traffic environmental data may be irregular movement (e.g., vertical vibration) of on-road vehicles caused by specific road conditions (e.g., obstacles on roads, bumps or dents in roads, etc.)

In the example of FIG. 3, the flowchart continues to module 316, with receiving a training result generated by executing a 4D GAN discriminator sub-model. In a specific implementation, the received training result includes results of matching of discrimination results with respect to one or more pieces of simulated 4D traffic environmental data generated by the 4D GAN generating engine, and may not include results of matching of discrimination results with respect to one or more pieces of real 4D traffic environmental data not generated by the 4D GAN generating engine.

In the example of FIG. 3, the flowchart continues to module 318, with modifying parameter values of the 4D GAN generator sub-model. In some embodiments, the parameter values of the 4D GAN generator sub-model are modified, so as to cause the training result to indicate less accuracy. In other words, the parameter values of the 4D GAN generator sub-model are modified, such that the 4D GAN discriminating engine is not able to distinguish simulated 4D traffic environmental data from real 4D traffic environmental data. In some embodiments, the parameter values of the 4D GAN generator sub-model may include the same parameters as and/or different parameters from the parameters of the 4D GAN discrimination sub-model.

According to the adversarial machine learning process for a four-dimensional (4D) generative adversarial network (GAN) model of some embodiments, the 4G GAN discrimination sub-model is modified so as to increase accuracy of discrimination analysis through the machine learning process, and the 4G GAN generating sub-model is modified so as to decrease the accuracy of discrimination analysis by the 4G GAN discrimination sub-model through machine learning process. By repeating the machine learning process, the 4G GAN discrimination sub-model may be improved to distinguish simulated 4D traffic environmental data from real 4D traffic environmental data with high accuracy, and the 4G GAN generating sub-model may be improved to generate simulated 4D traffic environmental data that is close to real 4D traffic environmental data enough to be not distinguishable easily.

Figure 4:
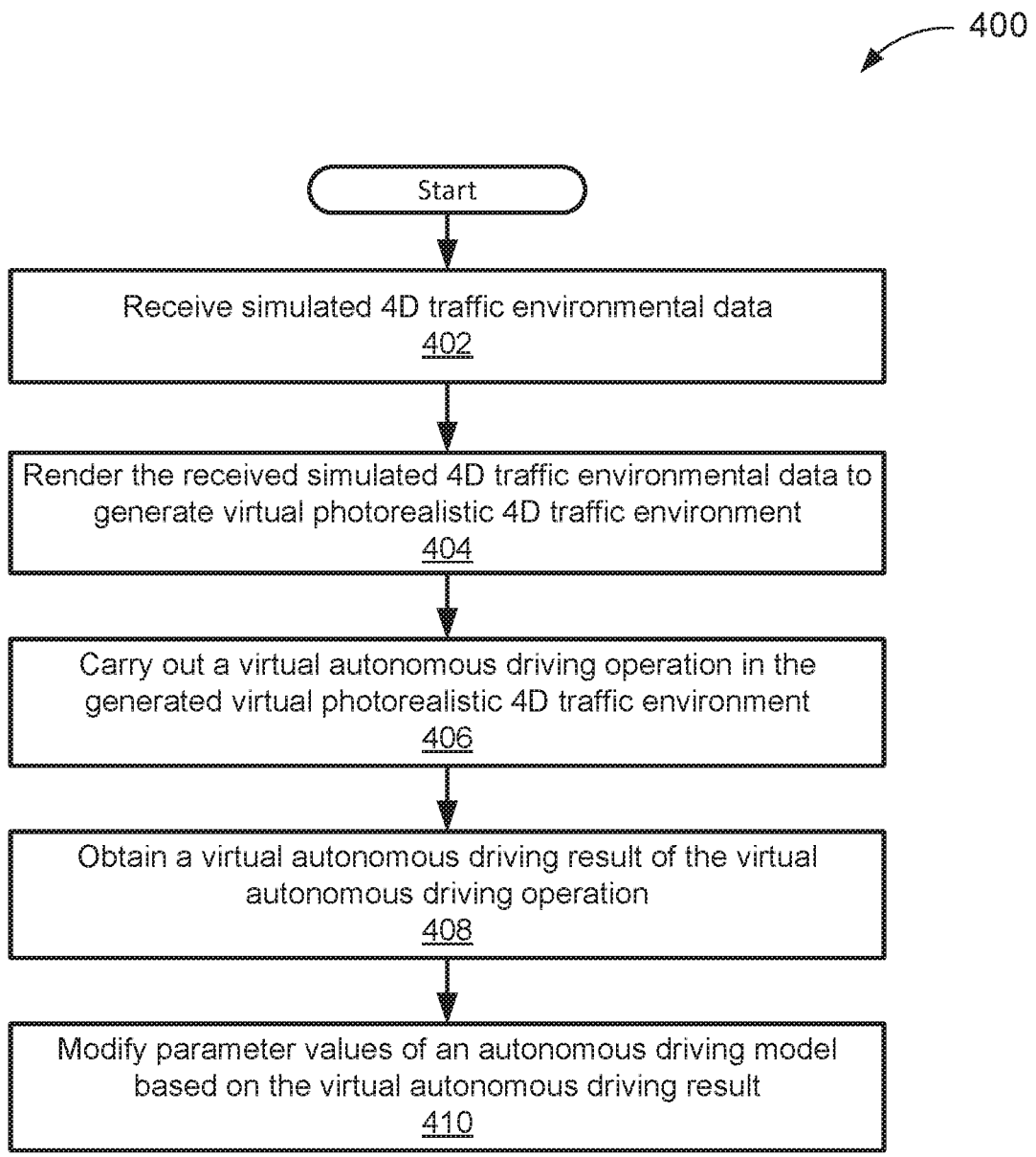
FIG. 4 depicts a flowchart of an example of specific processes for training a computer-based autonomous driving model according to some embodiments.

FIG. 4 depicts a flowchart of an example of specific processes for training a computer-based autonomous driving model according to some embodiments. The modules in the flowchart 400 are carried out by one or more applicable engines such as a virtual traffic provisioning engine (e.g., the virtual traffic provisioning engine 118 in FIG. 1) and a virtual drive simulating engine (e.g., virtual drive simulating engine 120 in FIG. 1) described in this paper, to train a computer-based autonomous driving model.

In the example of FIG. 4, the flowchart 400 starts at module 402, with receiving simulated 4D traffic environmental data. In some embodiments, the simulated 4D traffic environmental data is received from an applicable engine such as a 4D GAN generating engine (e.g., the 4D GAN generating engine 116 in FIG. 1). In some embodiments, the simulated 4D traffic environmental data is generated by the applicable engine executing a well-trained 4G GAN generating sub-model of a 4G GAN model.

In the example of FIG. 4, the flowchart 400 continues to module 404, with rendering the received simulated 4D traffic environmental data to generate virtual photorealistic 4D traffic environment. In some embodiments, the rendering of the simulated 4D traffic environmental data include expressing time-dependent locations and time-dependent characteristics of objects, such as roads, vehicles, pedestrians, roadside objects, and so on, with 4D functions, and generation of the virtual photorealistic 4D traffic environment using the 4D functions.

In the example of FIG. 4, the flowchart 400 continues to module 406, with carrying out a virtual autonomous driving operation in the generated virtual photorealistic 4D traffic environment. In some embodiments, the virtual autonomous driving operation includes a virtual autonomous driving along a certain route from a certain departing point in the virtual photorealistic 4D traffic environment to a certain destination point in the virtual photorealistic 4D traffic environment. Depending on a specific implementation, the certain route may further includes one or more roads to be used, and one or more intermediate check points to be passed. Further depending on a specific implementation, the certain route may be determined based on a selected one of driving modes, which may include an economic mode (e.g., lowest cost), a fastest mode, and so on. Moreover, the certain route may be dynamically changes as the virtual autonomous driving operation proceeds. In some embodiments, during the virtual autonomous driving operation, a virtual vehicle that performs the virtual autonomous driving operation is controlled according to the computer-based autonomous driving model so as to be safe to passengers and people and animals outside the virtual vehicle.

In the example of FIG. 4, the flowchart 400 continues to module 408, with obtaining a virtual autonomous driving result of the virtual autonomous driving operation. In some embodiments, the virtual autonomous driving result of the virtual autonomous driving operation includes an actual route of the virtual vehicle that has been used, a time-dependent position of the virtual vehicle in the actual route, a cost of the virtual autonomous driving operation, any risks and/or incidents involved in the virtual autonomous driving operation, difference between a planned operation and actual operation that has been carried out, and so on.

In the example of FIG. 4, the flowchart 400 continues to module 410, with modifying parameter values of an autonomous driving model based on the virtual autonomous driving result. In some embodiments, the parameters of the autonomous driving model may include various applicable parameters, including one or more parameters indicating movement behavior of a vehicle (e.g., acceleration, braking, steering, idling, etc.), exterior non-movement behavior of the vehicle (e.g., light, flashing, honking, etc.), interior non-movement behavior of the vehicle (e.g., navigation, audio, warning, etc.). In some embodiments, the parameters of the autonomous driving model may include parameters associated with route selection to achieve selection of time-efficient and/or cost-efficient route. In some embodiments, the autonomous driving model is modified so as to improve the virtual autonomous driving operation that has been carried out in various applicable aspects, such as safety, time efficiency, cost efficiency, etc. For example, to improve safety of the virtual autonomous driving operation, one or more parameters of the autonomous driving model associated with acceleration, braking, and/or steering levels are modified. In another example, to improve time efficiency and/or cost efficiency of the virtual autonomous driving operation, one or more parameters of the autonomous driving model associated with route selection and one or more parameters of the autonomous driving model associated with acceleration and braking are modified.

According to the training of the computer-based autonomous driving model of some embodiments, the computer-based autonomous driving model is modified so as to enable improved autonomous driving operation through the machine learning process. By repeating the machine learning process, the computer-based autonomous driving model may be improved to achieve a safer, more time-efficient, and more cost-efficient autonomous driving, even without carrying out a real-world autonomous test driving operation, which may involve higher risk of traffic incidents involving passengers and/or people around the vehicle. Further, compared to the real-world autonomous test driving operation, which requires to bring the vehicle to real-world traffic environments, the computer-based autonomous driving model for the autonomous driving can be improved at lower cost and through variety of different traffic environments simulating variety of conditions that cannot be obtained at a single geographical location (e.g., weather, congestion, pedestrian density, etc.).

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
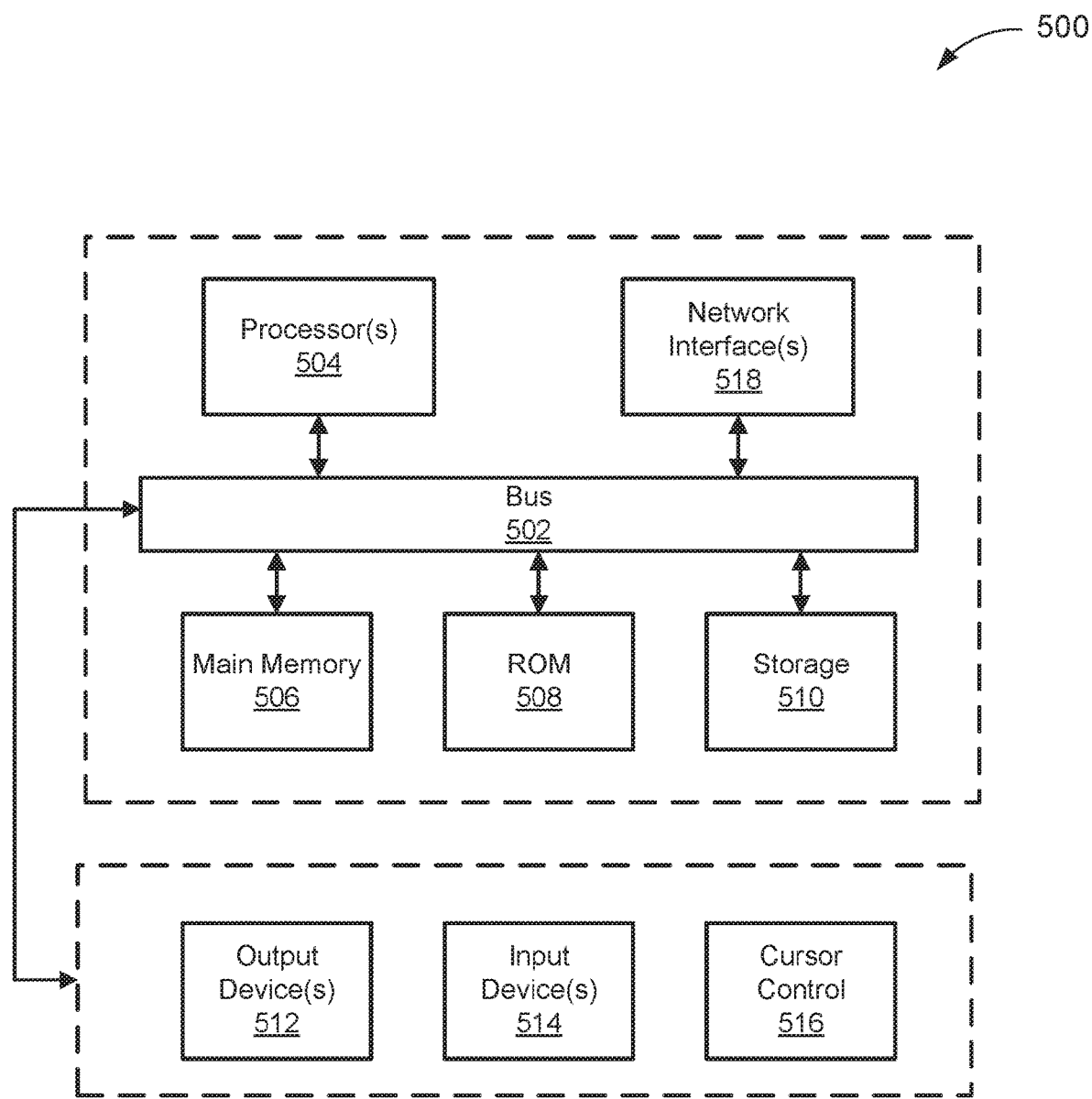
FIG. 5 is a block diagram illustrating a computer system upon which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to output device(s) 512, such as a cathode ray tube (CRT) or LCD display (or touch screen), for displaying information to a computer user. Input device(s) 514, including alphanumeric and other keys, are coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer-implemented method comprising:
    creating time-dependent three-dimensional (3D) traffic environment data using at least one of real traffic element data and simulated traffic element data;
    creating simulated time-dependent 3D traffic environmental data by applying a time-dependent 3D generative adversarial network (GAN) model to the created time-dependent 3D traffic environment data, wherein the simulated time-dependent 3D traffic environmental data includes object movement data indicating an irregular movement of one or more objects around a road; and
    training a computer-based autonomous driving model using the simulated time-dependent 3D traffic environmental data.

2. The computer-implemented method of claim 1, further comprising:
    creating the time-dependent 3D generative adversarial network (GAN) model through an adversarial machine learning process of a time-dependent 3D GAN discriminator sub-model and a time-dependent 3D GAN generator sub-model of the time-dependent 3D GAN model.

3. The computer-implemented method of claim 2, wherein the adversarial machine learning process of the time-dependent 3D GAN discriminator sub-model comprises:
receiving time-dependent 3D GAN discriminator training data from the time-dependent 3D GAN generator sub-model;
performing, using the time-dependent 3D GAN discriminator sub-model, discrimination analysis of the received time-dependent 3D GAN discriminator training data to generate a discrimination result indicating whether the time-dependent 3D GAN discriminator sub-model determined that the time-dependent 3D GAN discriminator training data represents real-world time-dependent 3D traffic environmental data or simulated time-dependent 3D traffic environmental data;
performing matching of the generated discrimination result with supervisory data indicating whether the time-dependent 3D GAN discriminator training data represents real-world time-dependent 3D traffic environmental data or simulated time-dependent 3D traffic environmental data, to generate a training result indicating a trained level of the time-dependent 3D GAN discriminator sub-model; and
modifying parameter values of the time-dependent 3D GAN discrimination sub-model based on the training result.

4. The computer-implemented method of claim 3, wherein the adversarial machine learning process of the time-dependent 3D GAN generator sub-model further comprises:
generating, using the time-dependent 3D GAN generator sub-model, simulated time-dependent 3D traffic environmental data;
providing the generated simulated time-dependent 3D traffic environmental data for creating time-dependent 3D GAN discriminator training data to be used by the time-dependent 3D GAN discriminator sub-model;
receiving the training result from the time-dependent 3D GAN discriminator sub-model; and
modifying parameter values of the time-dependent 3D GAN generator sub-model based on the training result.

5. The computer-implemented method of claim 2, wherein the adversarial machine learning process of the time-dependent 3D GAN generator sub-model comprises:
generating, using the time-dependent 3D GAN generator sub-model, simulated time-dependent 3D traffic environmental data;
providing the generated simulated time-dependent 3D traffic environmental data for creating time-dependent 3D GAN discriminator training data;
receiving a training result indicating a trained level of the time-dependent 3D GAN discriminator sub-model from the time-dependent 3D GAN discriminator sub-model; and
modifying parameter values of the time-dependent 3D GAN generator sub-model based on the training result.

6. The computer-implemented method of claim 1, wherein the training the computer-based autonomous driving model comprises:
rendering the simulated time-dependent 3D traffic environmental data to generate a virtual photorealistic time-dependent 3D traffic environment;
carrying out, using the computer-based autonomous driving model, a virtual autonomous driving operation in the generated virtual photorealistic time-dependent 3D traffic environment;
obtaining a virtual autonomous driving result of the virtual autonomous driving operation; and
modifying parameter values of the computer-based autonomous driving model based on the virtual autonomous driving result.

7. The computer-implemented method of claim 1, further comprising performing a real-world autonomous driving operation using the trained computer-based autonomous driving model.

8. A system for an autonomous-driving vehicle, comprising:
one or more processors; and
memory storing instructions that, when executed by the one or more processors, cause the one or more processors to:
create time-dependent three-dimensional (3D) traffic environment data using at least one of real traffic element data and simulated traffic element data;
create simulated time-dependent 3D traffic environmental data by applying a time-dependent 3D generative adversarial network (GAN) model to the created time-dependent 3D traffic environment data, wherein the simulated time-dependent 3D traffic environmental data includes object movement data indicating an irregular movement of one or more objects around a road; and
train a computer-based autonomous driving model using the simulated time-dependent 3D traffic environmental data.

9. The computer-implemented method of claim 1, wherein the real traffic element data is used to create the time-dependent 3D traffic environment data, and the real traffic element data include at least one of geographical mapping data, traffic sign data, and traffic signal data of a real-world geographical region.

10. The computer-implemented method of claim 1, wherein the simulated traffic element data is used to create the time-dependent 3D traffic environment data, and the simulated traffic element data include at least one of simulated weather data, simulated traffic signal change data, simulated pedestrian data, and simulated obstacles data.

11. The system of claim 8, wherein the simulated traffic element data is used to create the time-dependent 3D traffic environment data, and the simulated traffic element data include at least one of simulated weather data, simulated traffic signal change data, simulated pedestrian data, and simulated obstacles data.

12. The system of claim 8, wherein the instructions cause the one or more processors to create the time-dependent 3D generative adversarial network (GAN) model through an adversarial machine learning process of a time-dependent 3D GAN discriminator sub-model and a time-dependent 3D GAN generator sub-model of the time-dependent 3D GAN model.

13. The system of claim 12, wherein the adversarial machine learning process of the time-dependent 3D GAN discriminator sub-model comprises:
receiving time-dependent 3D GAN discriminator training data from the time-dependent 3D GAN generator sub-model;
performing, using the time-dependent 3D GAN discriminator sub-model, discrimination analysis of the received time-dependent 3D GAN discriminator training data to generate a discrimination result indicating whether the time-dependent 3D GAN discriminator sub-model determined that the time-dependent 3D GAN discriminator training data represents real-world time-dependent 3D traffic environmental data or simulated time-dependent 3D traffic environmental data;

performing matching of the generated discrimination result with supervisory data indicating whether the time-dependent 3D GAN discriminator training data represents real-world time-dependent 3D traffic environmental data or simulated time-dependent 3D traffic environmental data, to generate a training result indicating a trained level of the time-dependent 3D GAN discriminator sub-model; and modifying parameter values of the time-dependent 3D GAN discrimination sub-model based on the training result.

14. The system of claim 13, wherein the adversarial machine learning process of the time-dependent 3D GAN generator sub-model further comprises:

generating, using the time-dependent 3D GAN generator sub-model, simulated time-dependent 3D traffic environmental data;

providing the generated simulated time-dependent 3D traffic environmental data for creating time-dependent 3D GAN discriminator training data to be used by the time-dependent 3D GAN discriminator sub-model;

receiving the training result from the time-dependent 3D GAN discriminator sub-model; and modifying parameter values of the time-dependent 3D GAN generator sub-model based on the training result.

15. The system of claim 12, wherein the adversarial machine learning process of the time-dependent 3D GAN generator sub-model comprises:

generating, using the time-dependent 3D GAN generator sub-model, simulated time-dependent 3D traffic environmental data;

providing the generated simulated time-dependent 3D traffic environmental data for creating time-dependent 3D GAN discriminator training data;

receiving a training result indicating a trained level of the time-dependent 3D GAN discriminator sub-model from the time-dependent 3D GAN discriminator sub-model; and modifying parameter values of the time-dependent 3D GAN generator sub-model based on the training result.

16. The system of claim 8, wherein the training the computer-based autonomous driving model comprises:

rendering the simulated time-dependent 3D traffic environmental data to generate virtual photorealistic time-dependent 3D traffic environment;

carrying out, using the computer-based autonomous driving model, a virtual autonomous driving operation in the generated virtual photorealistic time-dependent 3D traffic environment;

obtaining a virtual autonomous driving result of the virtual autonomous driving operation; and modifying parameter values of the computer-based autonomous driving model based on the virtual autonomous driving result.

17. The system of claim 8, wherein the instructions cause the one or more processors to perform a real-world autonomous driving operation using the trained computer-based autonomous driving model.

18. The system of claim 8, wherein the real traffic element data is used to create the time-dependent 3D traffic environment data, and the real traffic element data include at least one of geographical mapping data, traffic sign data, and traffic signal data of a real-world geographical region.

* * * * *